Fig.1

Inventor:
Hermann Greiner
Erich von Gregor

Inventor:
Hermann Greiner
Erich von Gregor
by Michael S. Striker Attorney

3,308,235
METHOD AND ARRANGEMENT FOR THE OPERATION OF PICK-UP TUBES, PREFERABLY OF THE IMAGE-ORTHICON TYPE
Hermann Greiner and Erich von Gregor, Darmstadt, Germany, assignors to Fernseh G.m.b.H., Darmstadt, Germany
Filed Sept. 27, 1963, Ser. No. 312,128
Claims priority, application Germany, Sept. 29, 1962, F 37,915
20 Claims. (Cl. 178—7.2)

The present invention relates to apparatus and methods for the operation of pick-up tubes, wherein the charge pattern on a storage electrode is scanned by a beam of slow electrons and the pick-up tube output or picture signal is produced by the electron beam returning from the storage electrode. More particularly, the invention relates to pick-up tubes of image-orthicon type, wherein the returning scanning beam has a predetermined intensity in the fly-back periods, so that the tube produces a reference value relative to the picture signal, preferably the black level.

In order to obtain the black level value from a pick-up tube of image-orthicon type, the potential of the storage electrode may be made negative relative to that of the beam cathode during the retrace times, so that no electrons can land on the storage electrode and that the whole beam current will return. The beam current is amplified by the secondary electron multiplier built into the tube and the output current thereof produces a maximum voltage drop at the load, from which the picture signal is derived. This signal or reference value is defined as "full black" with regard to the picture signal generated by the tube and is independent of the picture contents. By means of a gated black level control or clamping circuit, the black level may be introduced into the picture signal in a known manner by means of this reference value. Moreover, the noise, for example, hum, which is superimposed on the picture signal is suppressed by the clamping circuit.

However, this mode of operation entails a serious disadvantage. Since the beam current contains a considerable noise portion, for example, 7 percent of the beam current intensity, a noise portion of the same size also occurs in the picture signal generated by the tube. At the maximum value of the signal, the noise portion in proportion to the full beam current also reaches its maximum value. The reference value to which the control or clamping circuit responds therefore shows irregular fluctuations. Since the clamping circuit responds to the momentary value at the end of the clamping time and since such momentary value shows statistical fluctuations to a considerable extent in consequence of the noise portion, the potential of the picture signal varies in each scanning period. It follows that different brightness values are associated with the signal due to the gated black level control circuit during the individual periods between the scanning times. If the variation of the potential of the storage electrode and the gating of the clamping circuit is executed during the line retrace time, the individual lines show different brightness values. This phenomenon is known as "line noise." It is observed as irregular bright or dark horizontal stripes in the television image and is extremely disturbing, far more disturbing than the actual noise portion of the picture signal, although the noise amplitude is the same.

In order to decrease the effects of this phenomenon, the time constant of the gated black level control circuit is increased to the extent that the statistical fluctuations of the reference value for the black level control circuit are integrated during a greater number of gating periods.

If the time constant of the gated black level control circuit is, however, increased to the extent that the "line noise" ceases to be disturbing, the clamping circuit no longer compensates sufficiently for the noise superimposed on the picture signal, for example, hum or tilt caused by the time constants in the amplifiers. If a bidirectional gated clamping circuit is utilized for the black level control, a condenser of, for example, 0.03 ... 0.1 microfarad would be necessary for sufficient integration of the noise component of the reference value, whereas a substantially smaller time constant of the clamping circuit is required for an effective suppression of the superimposed noise, for example, a noise of the power supply frequency. In order to decrease a noise of the power supply frequency to one percent, the charging condenser of the clamping circuit in an amplifier containing electron tubes should have a capacity not greater than about 1,000 micromicrofarads.

In order to overcome these difficulties, the electron beam may be interrupted in the pick-up tube during the retrace times. In this case, the beam current is temporarily of zero value and therefore no noise is observed. However, the signal value of the interrupted beam is then no longer in proportion with the picture signal or its maximum value. The signal value obtained by the interruption of the beam is, due to the adjustment of the beam current, twice or several times greater than the value of the black-white difference in the picture signal. In order to be able to use the reference value obtained by the interruption of the beam for the recovery of the black value, it would be necessary to have an exact reference signal for black. The signal amplitude would remain constant only if the beam current were no longer adjusted arbitrarily, because otherwise the black value in the picture signal would be altered. It would further be necessary to adjust the beam current to the prescribed value every time a tube is replaced. The amplification of the picture signal must also be kept constant ahead of the black level control stage. In particular, the constancy of the degree of amplification of the secondary electron multiplier in the pick-up tube has to meet exacting requirements. It would also be necessary to eliminate the variation of the amplification in the multiplier by variation of its operating voltage, as in compensating for the tolerances of the pick-up tubes.

The beam current of the pick-up tube may be adjusted to a constant value automatically. In view of the extremely small intensity of the beam current, the arrangement of an effective stable control circuit is very difficult and entails additional expense.

In order to avoid the aforesaid disadvantages, a method of operation of the present invention concerns pick-up tubes, preferably of the image-orthicon type, and includes the scanning of a charge pattern applied to the storage electrode by a beam of slow electrons and the deriving of the picture signal from the beam returning from the storage electrode.

According to one feature of the invention, the intensity of the scanning beam is controlled during the retrace times in such a manner that during a part of the retrace times it has a mean constant value different from zero serving as a reference value, for example, the black level or value. This picture signal amplitude reference value, resulting from this control action, is used for the insertion of the amplitude for picture black by means of a black level control circuit having a time constant large enough so that the high frequency statistical fluctuations of the reference value resulting from discontinuities of the beam current are integrated. At other parts of the retrace times a periodic sequence of noise-free second reference values or pulses is inserted in the picture signal. A gated control circuit responds to the second reference pulses and has a time constant smaller than the first-mentioned one and small enough to compensate for the low frequency noise superimposed upon the picture signal.

By the temporal separation of the reference values or pulses supplied by the pick-up tube and due to the reference pulses having a known relation to the signal amplitudes, such reference pulses may be used for the insertion of the black level or value and of noise-free reference impulses applied for the compensation of super-imposed noise. The control circuits which respond to both the first and second reference values or pulses may be adjusted to their optimal values according to their functions. The black level control circuit responding to the first reference pulses with a considerable noise portion supplied by the picture signal may then operate with a time constant large enough so that the statistical fluctuations of the black level caused by the noise portion of the reference signal may be completely suppressed and that thus the picture signal supplies a constant black level and no line noise is observed in the picture. On the other hand, the time constant of the control circuit for the compensation of the superimposed noise, for example, of the power supply frequency, which responds to the noise-free second reference pulses, may be made small enough so that without any disadvantage the superimposed noise may be effectively suppressed.

In practice, the method according to the invention may be modified in many ways. On the one hand, it may be modified with regard to the production of the reference signal and on the other hand, it may be modified with regard to the kind and periodicity of the two sequences of reference values or pulses, and these two modifications may be combined as desired. The noise-free reference pulse may be inserted in the picture signal during every second line gap, whereas the other line gaps contain the reference pulse or value supplied by the pick-up tube. The black level control circuit with a large time constant is in this case gated by a pulse sequence of half the line frequency. Thus, the gating pulses occur at intervals, more particularly, when the reference values supplied by the pick-up tube, preferably the reference level or value for black, occur. The control circuit of small time constant for the compensation of the superimposed noise is also gated with a pulse sequence of half the line frequency, whereby both sequences of gating signals are shifted or offset relative to each other in the amount of a line duration, so that they are temporally interlaced. However, the control or clamping circuit with a small time constant operates only in every second line period and is thus not as effective as when it would be if it were gated in each line period. As a consequence of the optimal dimensioning possible in the method of the present invention, the effect is in practice quite sufficient.

In another modification of the method of the present invention, in each line retrace interval the reference level for black is delivered by the pick-up tube and a noise-free reference pulse is inserted. The two control circuits in the amplifiers with different time constants operate with gating pulses of line frequency, which follow each other in close succession, so that the gating pulse for the black level control circuit occurs in the picture signal during the time of the reference value for black and the gating pulse for the control circuit with a small time constant occurs during the time of the noise-free reference pulse or value.

In another modification of the method of the present invention, which is preferable in many cases, the black value of the pick-up tube is transmitted only during the field gaps, that is, during vertical blanking time and the reference pulses for the compensation of noise are inserted in all of the line gaps. In this case, the control circuit for the compensation of noise operates during each of the line gaps. Therefore, the control circuit compensates for the superimposed noise as often as possible. It has been found by experience that for the black level control circuit it is sufficient, if the black value is corrected at greater intervals, in this case during each field gap. The time constant must then be sufficient to maintain the black value during the field period of the television picture. By reason of the longer period during which the black value is transmitted, the charge of the condenser of an appropriate size in the black level control circuit may be changed or used nearly completely.

In general, the execution of the method of the present invention requires the transmission of the black value and of the noise-free reference value at different times and periods which are not used for the transmission of the actual picture signal, that is during the line and field retrace times. How the two sequences of reference values are distributed in the signal does not go to the essence of the invention. The aforementioned cases represent only a few suitable examples out of numerous possibilities.

There are also a great number of ways in which the noise-free reference value in television signals may be obtained and some methods suitable for doing this in practice are hereinafter described as examples. The obvious and most simple method is to interrupt the signal periodically, that is at a point where the signal does not yet contain external noise, possibly next to where the signal is generated. This condition is most completely fulfilled when the scanning beam of the pick-up tube is interrupted periodically. The signal could, however, also be interrupted in the pick-up tube of the image-orthicon type by keying the electron multiplier. All these methods resulting in a zero value of the signal, although supplying a noise-free reference value, provide a reference value or pulse which is outside the amplitude range of the picture signal. At best, the picture signal for white has an amplitude which is half the amplitude of the signal for black, so that relative to the black level the reference level or pulse has double the amplitude of the black-white difference. In order that the reference value be transmitted correctly, the range of modulation of the amplifiers preceding the gated clamping device of low time constant has to be made substantially greater than it would be for the amplification of the picture signal alone.

This disadvantage may be overcome to a certain extent by inserting a pulse in the periods in which the signal is of zero value. The inserted pulse increases the reference value or level to such an extent that it occurs possibly within the amplitude range of the picture signal. If, however, the usual arrangements for the adjustment of the beam current of the pick-up tube and the amplification of the signal in the tube or immediately after being derived from the tube, for example, by variation of the degree of amplification of the secondary electron multiplier, are maintained, in this case, too, the reference value may fluctuate within wide limits relative to the picture signal.

Although in the aforementioned case, the reference value or level is smaller than the lowest amplitude of the picture signal for white, the reference value may be chosen greater than the maximum signal amplitude for black. For this purpose, the beam current of the pick-up tube may be increased within the periods, in which the reference value is to occur, for example, during the line gaps, and the so formed signal or pulse containing noises is clipped by a limiter to a constant noise-free level. The same result is obtained if the beam current is brought to its maximum value in the same manner as for obtaining the reference value for black by decreasing the potential of the storage electrode and, if an additional pulse of the same polarity is added, so that the level of the reference pulses is increased by the value of the additional pulse. A noise-free reference value may then be again obtained by clipping the noise containing pulse portions with, for example, a limiter.

In the aforementioned cases, too, the reference value is outside the actual range of the picture signal, although the deviation is not as great as when applying the aforedescribed method for obtaining the reference value by interruption of the signal. The reference pulse or value may be always positioned inside the range of the picture signal and corresponding to its mean value. For this purpose, a phase inverter stage is arranged in the preamplifier possibly immediately after the pick-up tube and supplies a signal with opposed polarity. This signal is added to the original picture signal; the two signals having mutually opposed polarities and the same shape. In the output of the adding stage, therefore, no fluctuating signal, but only the mean value of the signal is observed. The phase inverter stage controlled by gating pulses operates exclusively during the periods when the reference value occurs, that is, during the line gaps. During these periods, a noise-free reference value is obtained, since the noise portions contained in the two opposed polarity signals are compensated.

In accordance with the present invention, the apparatus for the operation of a pick-up tube includes a pick-up camera tube having a storage electrode adapted to store an image representing a charge pattern and a scanning arrangement for scanning at a predetermined scanning line frequency and a predetermined field frequency the pattern on the storage electrode by means of a scanning beam and producing by means of a beam current returned by the scanning beam a picture signal corresponding to the scanned charge pattern, and a beam control arrangement for varying under the control of first control pulses applied thereto the intensity of the beam current between zero and a predetermined value. A camera control arrangement includes a control circuit for influencing under the control of second control pulses applied thereto the amplitude of the picture signal during selected time periods. A pulse former connected to the pick-up camera and to the camera control arrangement produces at the scanning line frequency and applies corresponding therewith the first control pulses to the beam control arrangement and simultaneously the second control pulses to the control circuit.

In accordance with the present invention, a method for the operation of a pick-up tube of the image-orthicon type having a storage electrode wherein a charge pattern applied to the storage electrode is scanned by a scanning beam of slow electrons and the picture signal is produced by the beam current provided by the beam returning from the storage electrode, comprises the step of controlling the intensity of the scanning beam current during one part of its retrace time periods in such a manner that the beam current intensity assumes a mean constant first reference value different from zero but subject to high frequency statistical fluctuations resulting from discontinuities of the scanning beam current. A direct current component corresponding to the mean constant first reference value is inserted into the picture signal during one part of the retrace time under the control of a first control circuit having a time constant large enough so that the high frequency statistical fluctuations of the first reference value are integrated. During a different part of the retrace time periods a noise-free second reference value of constant level is inserted in the picture signal. Said constant level in the picture signal on which low-frequency noise is superimposed is restored by a second control circuit having a time constant small enough so that the low frequency noise is substantially compensated.

In order that the present invention may be readily carried into effect, it will now be described with reference to the accompanying drawings, wherein.

Figure 1:
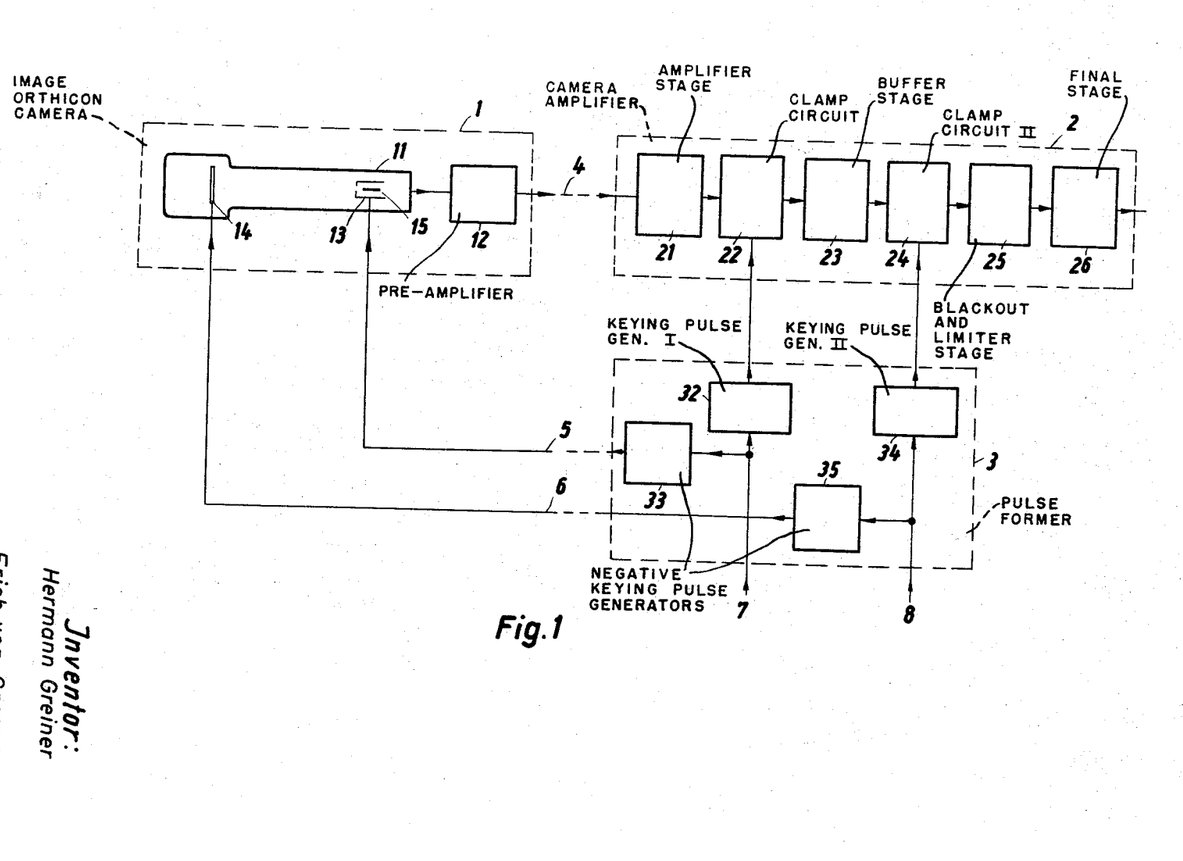
FIG. 1 is a schematic block diagram of an embodiment of a television camera arrangement including a pick-up tube of the image-orthicon type in an arrangement of the present invention.

FIG. 1 is an embodiment of an arrangement of the present invention and includes a camera arrangement containing a pick-up tube camera arrangement 1 of the image-orthicon type. The picture signal produced by the image-orthicon 11 is amplified in the preamplifier 12 to the extent that it may be transmitted via a coaxial connection 4 in the camera cable to the camera amplifier 2.

In accordance with the present invention, the video signal reaches a first control circuit 22 after passing through an amplifier 21. In the first control circuit 22, noise-free reference values inserted in the video signal are brought to a predetermined uniform level in order to suppress low frequency noise superimposed on the video signal by, for example, an A.C. voltage of power supply frequency. For this purpose, the control circuit 22 may comprise a bidirectional clamping circuit.

The reference values of constant noise-free potential are in this case provided by the periodic interruption of the beam current in the pick-up tube 11 during the retrace times. For this purpose, a negative pulse sequence I is applied to the Wehnelt electrode 13 of the image-orthicon 11 via the connection 5.

The negative pulse sequence is derived in a pulse former 3 from a pulse sequence I of line scanning frequency furnished by a suitable source or pulse generator, not shown in FIG. 1, via a connection 7 to a negative keying pulse generator arrangement 33. The same pulse sequence I is used to produce in a keying pulse generator arrangement 32 keying pulses for the control circuit 22. The temporal position and duration of the keying pulses are selected in such a manner that the control circuit 22 is gated during the occurrence of the reference value or level in the video signal obtained by the interruption of the beam current. The control circuit 22 has a time constant which is so small that it compensates, except for an insignificant remainder, for the variation of the potential of the video signal caused by superimposed low frequency noise during each keying period.

The video signal with the superimposed noise compensated for the manner described, is fed to a second control circuit 24 via a separator or buffer stage 23. The black level control of the video signal is effected in the second control circuit 22. The black level in the signal is obtained by periodically bringing the storage electrode 14 of the image-orthicon 11 to a negative potential by a pulse sequence supplied via the connection 6. The negative potential has so large a magnitude compared with that of the beam cathode 15 that no electrons can land on the storage electrode and the beam current returns from said storage electrode in its full intensity. Corresponding to the full intensity beam current is a maximum value of the video signal corresponding to the signal amplitude for the black level or value.

The periodic variation of the potential of the storage electrode 14 is caused by a second sequence of pulses II which are supplied to the pulse former 3 from a suitable source or pulse generator, not shown in FIG. 1, via a connection 8. From this sequence of pulses, on the one hand, a sequence of pulses of appropriate polarity (negative) and amplitude for the blanking of the storage electrode 14 is derived in a negative keying pulse generator arrangement 35, while on the other hand, the keying pulses for the second control circuit 24 are generated in a keying pulse generator arrangement 34 also on the basis of the pulse sequence II supplied thereto. The control circuit 24 may also be a bidirectional clamping circuit, which has, however, contrary to the first control circuit 22, a time constant so large that the reference value contained in the black level or value, which fluctuates by reason of the superimposed noise is integrated in the course of a greater number of keying periods. The black level controlled signal is then blacked out in a blackout and limiter arrangement 25 in the usual manner by clipping the signal at the black level and is transmitted via a final stage 26 to the output of the amplifier 2.

Figure 2:
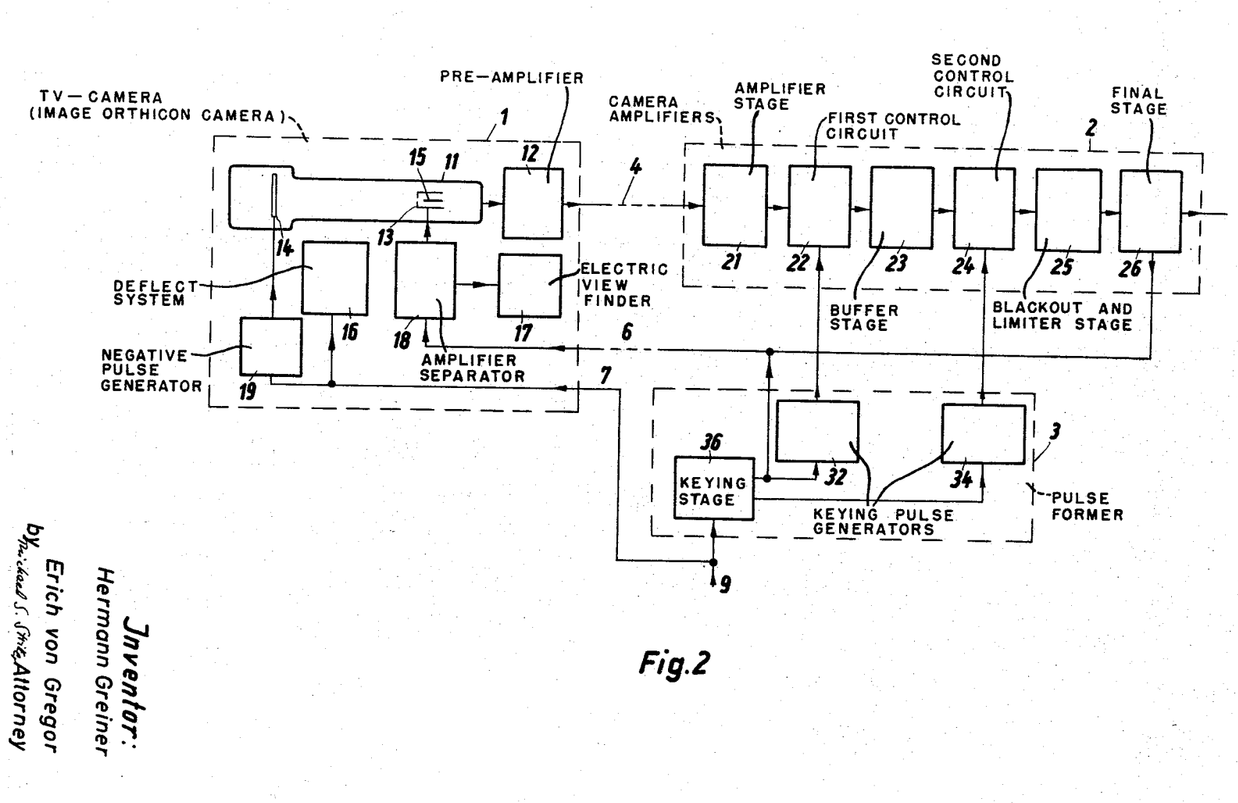
FIG. 2 is a schematic block diagram of another embodiment of an image-orthicon camera arrangement, wherein the black value and the reference value are transmitted alternately during the line gaps in an arrangement of the present invention.

FIG. 2 is another embodiment of an arrangement of the present invention, including a camera arrangement with a pick-up tube of the image-orthicon type. The camera arrangement comprises the television camera 1 and the camera amplifier 2 as aforedescribed, connected by a coaxial connection 4 in the camera cable. The arrangement of FIG. 2 also indicates the manner in which a camera arrangement of the kind described according to the invention may be arranged without increasing the number of connections in the camera cable. The television camera 1 comprises the pick-up tube 11 of the image-orthicon type and the preamplifier 12 for the amplification of the picture signal supplied by the camera tube 11 and transmitted via the coaxial connection 4 of the camera cable to the camera amplifier 2. Another coaxial connection 7 in the camera cable transmits synchronizing pulses of line scanning frequency to the deflecting system 16 of the camera 1.

The camera 1 comprises an electronic view finder 17 which is supplied with a picture signal by the final stage 26 of the camera amplifier 2 via the coaxial connection 6. The connection 6 may be simultaneously used for transmitting an additional pulse to the camera for the interruption of the beam current in order to obtain a noise-free reference value in the signal produced by the tube 11. For this purpose, every second line pulse of the synchronizing pulse sequence of line scanning frequency supplied to the pulse former 3 by a pulse generator, not shown in FIG. 2, via a connection 9, is suppressed in a keying stage 36 of said pulse former.

The resulting pulse sequence of half the line scanning frequency obtained in the manner described is superimposed on the picture signal provided by the final stage 26, so that the amplitude of every second line synchronizing pulse is increased. The superimposed pulses are separated from the video signal by an amplitude separator 18 in the camera 1 before the video signal is supplied to the electronic view finder 17 and are applied to the Wehnelt electrode 13 of the image-orthicon 11. During the time that the noise-free reference values or levels obtained in this manner occur in the video signal, the control circuit 22 is keyed in the camera amplifier 2. The necessary clamping pulses are produced in a keying pulse generator arrangement 32 by the pulse sequence of half the line scanning frequency produced at the keying stage 36.

Aside from being utilized for the synchronizing of the deflection system, the synchronizing pulses of line scanning frequency sent via the connection 7 to the camera 1 are also used to decrease the potential of the storage electrode 14 of the image-orthicon 11 during the line gaps to the extent that no electrons of the scanning beam can land on the storage electrode so that the beam returns in its full intensity. In this manner, the reference value for the black level in the picture signal is obtained. This reference value occurs only during those line gaps in which the beam is not interrupted by keying the Wahnelt electrode 13. Within the periods in which the black level or value occurs in the video signal, the second control circuit 24, having a large time constant, operates in the camera amplifier 2. The second control circuit 24 is keyed by a clamping pulse sequence of half the line scanning frequency produced in a keying pulse generator arrangement 34 by a pulse sequence supplied by the keying stage 36.

Figure 3:
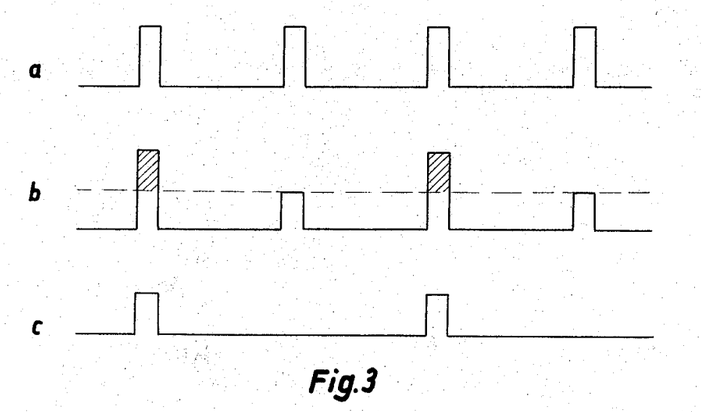
FIG. 3 is a graphical presentation of pulses evident at selected points of the arrangement of FIG. 2.

FIG. 3 illustrates pulse sequences evident in the arrangement of FIG. 2. The pulse sequence $a$ of FIG. 3 is of line scanning frequency provided by a suitable source or pulse generator, not shown in FIG. 2, via the connection 9. Two interlaced pulse sequences of half the line scanning frequency are produced from the pulse sequence $a$ at the keying stage 36. The pulse sequence $a$ is modulated by one of the interlaced pulse sequences to provide a pulse sequence $b$.

In the pulse sequence $b$ of FIG. 3, successive pulses are of different amplitudes; for example, every second pulse has twice the amplitude of the preceding one. The pulse sequence $b$ is superimposed on the picture signal for the electronic view finder 17 of the camera. A pulse sequence $c$ of half the line scanning frequency utilized to interrupt the scanning beam during every second line gap is derived from the pulse sequence $b$ by clipping the larger amplitude pulses along the broken line in the amplitude separator 18 and by utilizing alternate ones of the remaining equal amplitude pulses.

Figure 4:
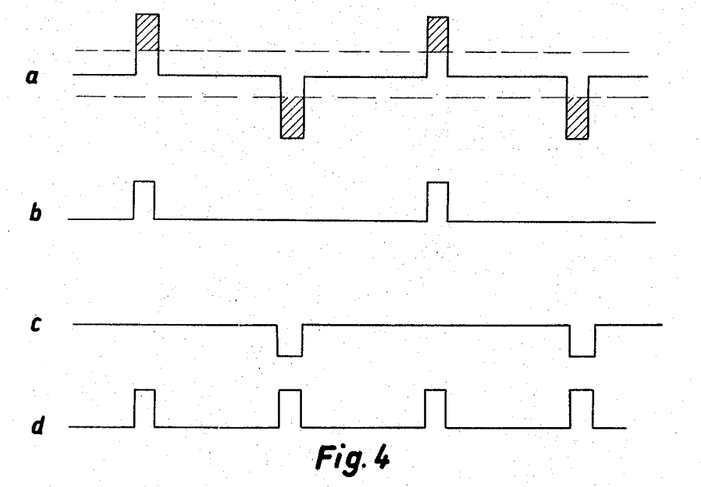
FIG. 4 is a graphical presentation of pulse sequences which would be evident in a modification of the arrangement of FIG. 2.

Another way of transmitting the keying pulses of half the line scanning frequency required in the camera for keying the Wehnelt electrode and the pulses required for the synchronizing of the horizontal deflection coils and, if desired, for the keying of the storage electrode 14 of the pick-up tube 11, via a single connection to the camera, is illustrated by FIG. 4. For this purpose, a pulse sequence $a$ of FIG. 4 of line scanning frequency and of alternating opposite polarities is transmitted to the camera.

Amplitude separators in the camera cut the pulse sequence $a$ of FIG. 4 along the dotted lines to provide two interlaced pulse sequences $b$ and $c$ of FIG. 4 of half the line scanning frequency. One of the interlaced pulses may be used for keying the Wehnelt electrode 13, and the other one of the interlaced pulses may be used for keying the storage electrode 14. In order to derive the pulse sequence of line scanning frequency required for synchronizing the line deflection coils in the camera from the pulse sequence $a$ of FIG. 4, the polarity of one of the pulse sequences $b$ and $c$ of FIG. 4 may be reversed and the reversed sequence may be added to the other pulse sequence. A pulse sequence $d$ of FIG. 4 of line scanning frequency is thus obtained.

In both cases, a noise-free reference value is inserted in the picture signal supplied by the image-orthicon within every second line gap by interruption of the beam current, whereas the black level or value obtained by keying the storage electrode 14 occurs within the other line gaps. The picture signal is of the shape represented schematically in FIG. 5. During the line gaps 1, 3, etc., the noise-free reference value appears. As described, the noise-free reference value or level corresponds to at least twice the maximum amplitude of the picture signal.

Figure 5:
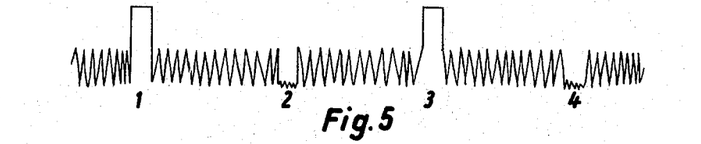
FIG. 5 is a graphical presentation of the signal produced in the arrangement of FIG. 2.

The black level or value, containing noise, is transmitted during the alternate line gaps 2, 4, etc. The two control circuits 22 and 24 respond to these two kinds of reference values or levels. The control circuits 22 and 24 are alternatingly keyed by clamping pulses of half the line scanning frequency. The first control circuit 22 has a small time constant during the line gaps 1, 3, etc., and the second control circuit 24 has a large time constant during the line gaps 2, 4, etc.

When the pulse sequence $b$ of FIG. 3 is utilized, the leading edge of each of the smaller amplitude pulses of line scanning frequency for the synchronizing of the deflecting device must occur at the same time intervals. In this respect, it is preferable to utilize a pulse sequence with pulses of alternatingly opposed polarities, but of the same amplitude, as shown in FIG. 4 as pulse sequence *a*.

Figure 6:
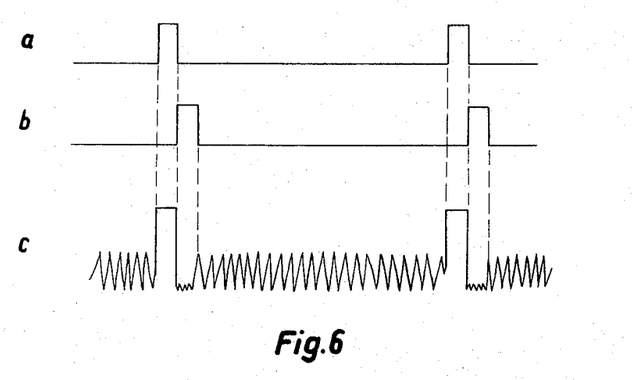
FIG. 6 is a graphical presentation of the temporal position of the pulses operating in an arrangement of the invention, in which both reference values are transmitted successively during each line gap.

Instead of transmitting both kinds of reference values alternatingly during the line gaps at half the line scanning frequency, both reference values or levels may also be successively included in the video signal during each line gap, as illustrated in FIG. 6. For this purpose, two pulse sequences *a* and *b* of FIG. 6 of line scanning frequency are utilized. The pulses of the pulse sequences *a* and *b* of FIG. 6 are correspondingly of shorter duration than the line gaps, so that each pulse of the first pulse sequence *a* is terminated before the corresponding pulse of the second pulse sequence *b* begins.

The first pulse sequence *a* of FIG. 6 supplies the noise-free reference level or value, for example, by interrupting the beam current of the pick-up tube, and determines the temporal position of the clamping pulses for the associated control circuit having a small time constant. The second pulse sequence *b* of FIG. 6 is used to provide the reference value for the black level by keying the storage electrode of the pick-up tube and to determine the times of occurrence of the clamping pulses for the black level control circuit having a large time constant.

The two pulse sequences *a* and *b* of FIG. 6 may be obtained directly from the line synchronizing pulses. To achieve this, the pulse sequence *a* of FIG. 6 is derived from the leading edges of the synchronizing pulses and the pulse sequence *a* may, for example, be differentiated and the pulse sequence *b* of FIG. 6 may be formed by the trailing edges of the synchronizing pulses.

The signal *c* of FIG. 6 illustrates the shape of the picture signal in this case. During all of the consecutive line gaps 1, 2, etc., the noise-free reference value or level gained by interruption of the beam current and the black level or value containing noise are transmitted successively.

In the aforedescribed arrangements of the present invention, the pulse sequences used for obtaining the two reference values, the associated keying pulses, and in certain cases the line synchronizing pulses produced in the camera, must have the required high temporal or occurrence time accuracy. In order to ensure this accuracy, brief needle pulses of a greater amplitude may be transmitted immediately preceding the individual pulses of the pulse sequences to provide accurate control of the pulse generators of the pulse sequences.

Figure 7:
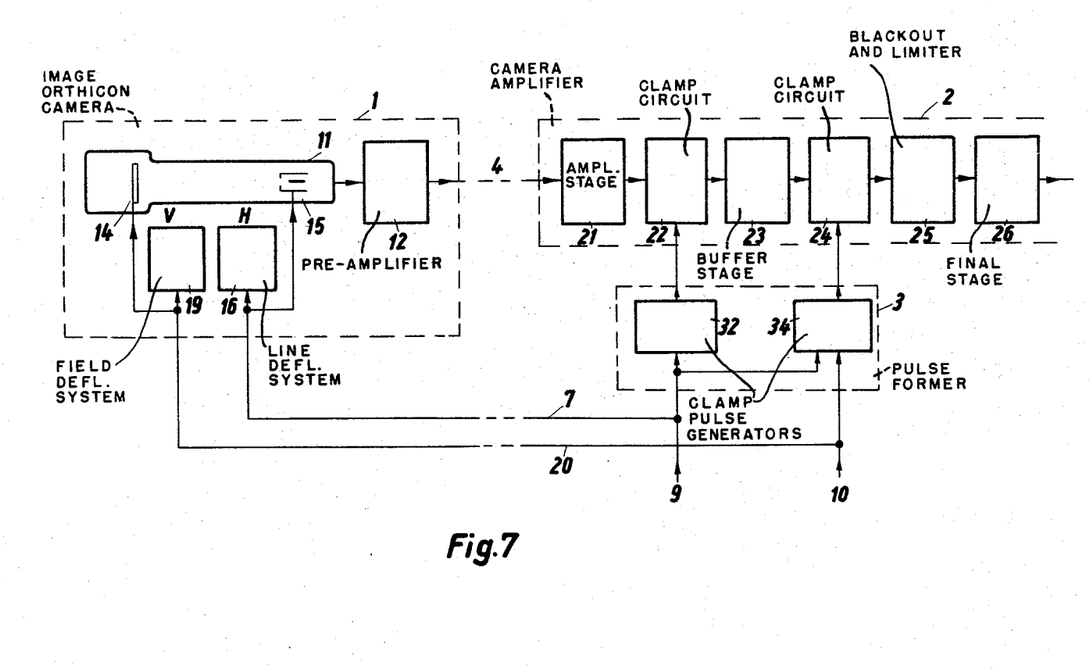
FIG. 7 is a schematic block diagram of another embodiment of an image-orthicon camera arrangement, wherein the black level is produced during the field blanking intervals and the noise-free reference value for the compensation of superimposed noise is produced during the line blanking intervals in an arrangement of the present invention.

Instead of transmitting the reference value for the black level alternatingly or successively during the line gaps, the noise-free reference value may be inserted in the picture signal during the line retrace time and the reference value for black may be transmitted during the field retrace time. An arrangement of the present invention for achieving this is shown in FIG. 7. The line synchronizing pulses delivered by suitable source or pulse generator, not shown in FIG. 7, via the connection 9 are transmitted via a lead 7 of the camera cable to the camera and control the horizontal deflecting system 16 of said camera. The same pulse sequence may also be used to obtain the noise-free reference pulse, for example, by interrupting the beam current, in which case this pulse sequence is applied to the Wehnelt electrode 15 of the image-orthicon 11.

In a pulse former 3, the clamping pulses for the control circuit 22 of the camera amplifier 2 are derived from the pulse sequence of line scanning frequency in the clamping pulse generator arrangement 32. The control circuit 22 has a small time constant and compensates for the noise of low frequency superimposed on the video signal. Synchronizing pulses of field frequency are supplied from a suitable source or pulse generator, not shown in FIG. 7, via a lead 10, and are transmitted to the camera via a connection 20.

The synchronizing pulses of field frequency control the vertical deflection system 19 of the camera and are also supplied to the storage electrode 14 so that the pick-up tube 11 supplies a reference value corresponding to the black level during the field gaps. In the clamping pulse generator arrangement 34 of the pulse former 3, clamping pulses of field frequency are derived from the synchronizing pulses of field frequency for the keying of the control circuit 24 having a large time constant. During the line gaps, these keying pulses are interrupted. For this purpose, the synchronizing pulses of line scanning frequency are also supplied to the clamping pulse generator arrangement 34.

Figure 8:
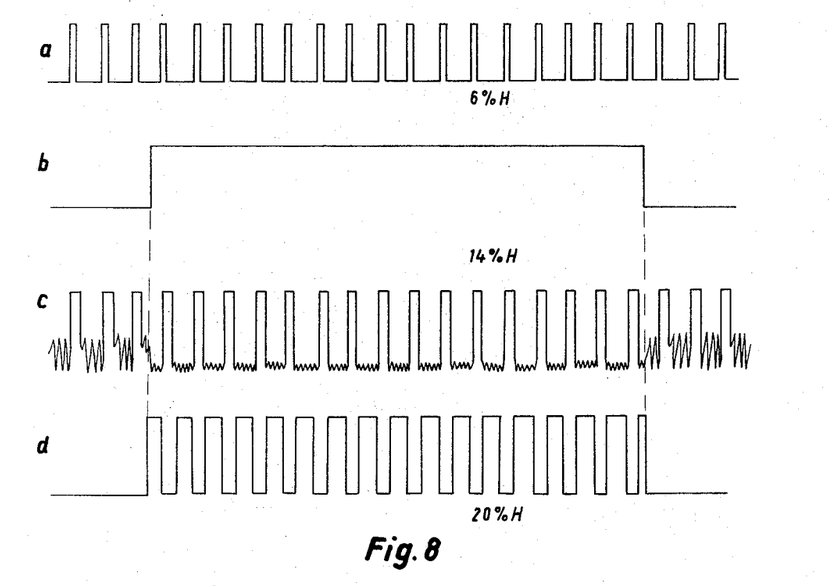
FIG. 8 is a graphical presentation of pulses evident at selected points of FIG. 6.

FIG. 8 illustrates the pulses evident at selected points of the arrangement of FIG. 7. The pulse sequence *a* of FIG. 8 is of line scanning frequency and of a pulse duration of, for example, 6 percent of the line period H. The pulse *b* of FIG. 8 is the synchronizing pulse sequence of field frequency which is of a duration, for example, of 15 line periods. The pulse sequences *a* and *b* of FIG. 8 are transmitted by the leads 7 and 20, respectively, of FIG. 7 to the camera and are used there, apart from synchronizing the deflecting devices, for obtaining during the line gaps in the picture signal supplied by the pick-up tube 11 a constant noise-free reference value, for example, by interrupting the beam current, and for bringing the picture signal to the black level or value during the field gaps by keying the storage electrode 14. The picture signal *c* of FIG. 8 then has the illustrated shape.

The noise-free reference value obtained by the interruption of the beam current occurs during each line gap, whereas during the field gaps the black level or value is transmitted. The black level is, however, interrupted by noise-free reference values of line scanning frequency. The clamping pulse *d* of FIG. 8 is produced in the clamping pulse generator 34 for keying the black level control circuit 24. The clamping pulse of field frequency is interrupted during the line gaps by the introduced pulse sequence of line scanning frequency with a duration of, for example, 20 percent of the line period H and blocks the clamping circuit during these periods, so that it only responds to the black level or value transmitted during the line periods.

In the arrangement of FIG. 7, the potential of the storage electrode 14 is only altered during the field gaps. Therefore, the tendency of the tube to produce a sound or microphonic noise is also decreased, since the mesh of the storage electrode 14 is no longer stimulated with the line scanning frequency, of, for example, 15,625 cycles per second, to their natural vibration, but only with the field frequency, of, for example, 50 cycles per second.

Furthermore the total period, in which the potential of the storage electrode 14 is shifted and in which the image stored thereon is blurred, is kept small, at 3 percent in comparison with 14 percent at the keying of the storage electrode in each line, and therefore the degree of image definition is higher. Finally, the embodiment of the invention of FIG. 7 is in practice particularly simple. This embodiment permits the utilization of camera arrangements operating conventionally. In the camera itself, no additional devices are necessary, since for obtaining the two types of reference values those pulse sequences are used which are in any case transmitted to the camera for the synchronizing of the deflecting systems.

In the camera amplifier 2 the addition of special arrangements is limited to the second control circuit 24 and the associated clamping pulse generator 34. While the first control circuit 22, which is keyed during every line gap, has a small time constant defined, for example, by a charging condenser of a few thousand micromicrofarads, the black level control circuit 24 requires a charging condenser of considerably greater charging capacity than in the arrangement of FIG. 2. In the case of FIG. 7, the charging condenser has a capacity of approximately 0.25 microfarad. Since, however, nearly the entire vertical retrace time is available for changing the charge, the time required therefor is sufficient in connection with conventional clamping circuits.

The installation of the second control circuit in an already existing normal camera amplifier is possible in almost any case when semiconductor diodes are utilized, even if the available space is limited. For the keying of the circuit, one of the keying pulses of line scanning frequency of the camera arrangement may be used.

The additional arrangement for the generation of the keying pulses of vertical frequency interrupted by pulses of line scanning frequency may also be provided in such a way that it does not require much space. There is no difficulty in equipping clamping pulse generator with transistors. The additional installation of transistors for the current supply in the camera amplifier is clearly possible, since this amplifier is as a rule of substantial size.

The camera itself, which as a rule is of small size, requires very few additional structural elements, as is shown in FIG. 7, since the pulse sequences of horizontal and vertical frequency transmitted to the camera for the synchronizing of the deflecting systems in any case may be used for the generation of the pulses for obtaining the noise-free reference values of line scanning frequency, for example, by interruption of the beam current, and for obtaining the black level or value by altering the potential of the storage electrode.

It will be understood that each of the elements described above, or two or more together, may also find a useful application in other types of method and arrangement for operating television pick-up tubes differing from the types described above.

While the invention has been illustrated and described as embodied in method and arrangement for operating television pick-up tubes of the image-orthicon type.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of operating television pick-up tubes, particularly tubes of the image-orthicon type, having a storage electrode and wherein a charge pattern applied to said storage electrode is scanned by a scanning beam of slow electrons and the picture signal is produced by the beam current provided by the beam returning from the storage electrode, comprising, in combination, the steps of: controlling the intensity of the scanning beam current during one part of its retrace time periods in such a manner that said beam current intensity assumes a mean constant first reference value different from zero but subject to high frequency statistical fluctuations resulting from discontinuities of said scanning beam current; inserting into the picture signal during said one part of said retrace time periods a direct current component corresponding to said mean constant first reference value under the control of a first control circuit having a time constant large enough so that said high-frequency statistical fluctuations of said first reference value are integrated; inserting during a different part of said retrace time periods in the picture signal produced by said pick-up tube a noise-free second reference value of constant level; and restoring in said picture signal during said different part of said retrace time periods a constant level by said noise-free second reference value under the control of a second control circuit having a time constant small enough so that low-frequency noise superimposed on the picture signal is substantially compensated.

2. A method as claimed in claim 1, including the step of controlling during said different part of said retrace time periods the intensity of said scanning beam current in such a manner that said beam current intensity assumes a substantially zero value whereby a noise-free second reference value of constant level is produced.

3. A method as claimed in claim 1, including the step of applying to the picture signal during said different part of said retrace time periods auxiliary pulses of predetermined polarity and duration for obtaining for said second reference value an amplitude level within the amplitude range of the picture signal furnished by the pick-up tube.

4. A method as claimed in claim 1, including the steps of increasing during said different part of said retrace time periods said beam current to such a value that the resulting temporary signal value reaches a level considerably outside the amplitude range of said picture signal occurring between said retrace time periods, and of clipping said temporary signal value in such a manner that the clipped temporary signal value constitutes said noise-free second reference value at a constant level.

5. A method as claimed in claim 1, including the step of adding during said different part of said retrace time periods to the signal furnished by the pick-up tube a signal of opposed phase but of the same amplitude so that the fluctuations of both said signals are compensated and thus said noise-free second reference value corresponding to the mean value of the picture signal is obtained.

6. A method of operating television pick-up tubes, particularly tubes of the image-orthicon type, having a storage electrode and wherein a charge pattern applied to said storage electrode is scanned by a scanning beam of slow electrons and the picture signal is produced by the beam current provided by the beam returning from the storage electrode, comprising, in combination, the steps of: controlling the intensity of the scanning beam current during one part of its retrace time periods in such a manner that said beam current intensity assumes a mean constant first reference value different from zero and constituting the black value of the picture signal but subject to high frequency statistical fluctuations resulting from discontinuities of said scanning beam current; inserting into the picture signal during said one part of said retrace time periods a direct current component corresponding to said mean constant first reference value under the control of a first control circuit having a time constant large enough so that said high-frequency statistical fluctuations of said first reference value are integrated; inserting during a different part of said retrace time periods in the picture signal produced by said pick-up tube a noise-free second reference value of constant level; and restoring in said picture signal during said different part of said retrace time periods a constant level by said noise-free second reference value under the control of a second control circuit having a time constant small enough so that low-frequency noise superimposed on the picture signal is substantially compensated.

7. A method of operating television pick-up tubes, particularly tubes of the image-orthicon type, having a storage electrode and wherein a charge pattern applied to said storage electrode is scanned by a scanning beam of slow electrons and the picture signal is produced by the beam current provided by the beam returning from the storage electrode, comprising, in combination, the steps of: controlling the intensity of the scanning beam current during one portion of each of its retrace time periods between consecutively scanned lines in such a manner that said beam current intensity assumes a mean constant first reference value different from zero and constituting the black value of the picture signal but subject to high frequency statistical fluctuations resulting from discontinuities of said scanning beam current; inserting into the picture signal during said one portion of each of said retrace time periods a direct current component corresponding to said mean constant first reference value under the control of a first control circuit having a time constant large enough so that said high-frequency statistical fluctuations of said first reference value are integrated; inserting during a different part of each of said retrace time periods in the picture signal produced by said pick-up tube a noise-free second reference value of constant level; and restoring in said picture signal during said different part of said retrace time periods a constant level by said noise-free second reference value under the control of a second control circuit having a time constant small enough so that low-frequency noise superimposed on the picture signal is substantially compensated.

8. A method of operating television pick-up tubes, particularly tubes of the image-orthicon type, having a storage electrode and wherein a charge pattern applied to said storage electrode is scanned by a scanning beam of slow electrons and the picture signal is produced by the beam current provided by the beam returning from the storage electrode, comprising, in combination, the steps of: controlling the intensity of the scanning beam current during one portion of each of its retrace time periods between consecutively scanned lines in such a manner that said beam current intensity assumes a mean constant first reference value different from zero and constituting the black value of the picture signal but subject to high frequency statistical fluctuations resulting from discontinuities of said scanning beam current; inserting into the picture signal during said one portion of each of said retrace time periods a direct current component corresponding to said mean constant first reference value under the control of a first control circuit having a time constant large enough so that said high-frequency statistical fluctuations of said first reference value are integrated; inserting during a different portion of each of said retrace time periods in the picture signal produced by said pick-up tube a noise-free second reference value of constant level; and restoring in said picture signal during said different portion of each of said retrace time periods and immediately ahead of said first reference value a constant level by said noise-free second reference value under the control of a second control circuit having a time constant small enough so that low-frequency noise superimposed on the picture signal is substantially compensated.

9. A method of operating television pick-up tubes, particularly tubes of the image-orthicon type, having a storage electrode and wherein a charge pattern applied to said storage electrode is scanned by a scanning beam of slow electrons and the picture signal is produced by the beam current provided by the beam returning from the storage electrode, comprising, in combination, the steps of: controlling the intensity of the scanning beam current during a first periodical sequence of its retrace time periods, respectively, in such a manner that said beam current intensity assumes a mean constant first reference value different from zero and constituting the black value of the picture signal but subject to high frequency statistical fluctuations resulting from discontinuities of said scanning beam current; inserting into the picture signal during said retrace time periods of said first sequence thereof a direct current component corresponding to said mean constant first reference value under the control of a first control circuit having a time constant large enough so that said high-frequency statistical fluctuations of said first reference value are integrated; inserting during a different second periodical sequence of said retrace time periods, respectively, in the picture signal produced by said pick-up tube a noise-free second reference value of constant level; and restoring in said picture signal during said retrace time periods of said second sequence thereof a constant level by said noise-free second reference value under the control of a second control circuit having a time constant small enough so that low-frequency noise superimposed to the picture signal is substantially compensated.

10. A method of operating television pick-up tubes, particularly tubes of the image-orthicon type, having a storage electrode and wherein a charge pattern applied to said storage electrode is scanned by a scanning beam of slow electrons and the picture signal is produced by the beam current provided by the beam returning from the storage electrode, comprising, in combination, the steps of: controlling the intensity of the scanning beam current during a first periodical sequence of its retrace time periods, respectively, in such a manner that said beam current intensity assumes a mean constant first reference value different from zero and constituting the black value of the picture signal but subject to high frequency statistical fluctuations resulting from discontinuities of said scanning beam current; inserting into the picture signal during said retrace time periods of said first sequence thereof a direct current component corresponding to said mean constant first reference value under the control of a first control circuit having a time constant large enough so that said high-frequency statistical fluctuations of said first reference value are integrated; inserting during a different second periodical sequence of said retrace time periods, respectively, alternating with said retrace time periods of said first sequence thereof in the picture signal a noise-free second reference value of constant level; and restoring in said picture signal during said retrace time periods of said second sequence thereof a constant level by said noise-free second reference value under the control of a second control circuit having a time constant small enough so that low-frequency noise superimposed on the picture signal is substantially compensated.

11. A method of operating television pick-up tubes, particularly tubes of the image-orthicon type, having a storage electrode and wherein a charge pattern applied to said storage electrode is scanned by a scanning beam of slow electrons and the picture signal is produced by the beam current provided by the beam returning from the storage electrode, comprising, in combination, the steps of: controlling the intensity of the scanning beam current during one part of its retrace time periods occurring between consecutively scanned fields in such a manner that said beam current intensity assumes a mean constant first reference value different from zero and constituting the black value of the picture signal but subject to high frequency statistical fluctuations resulting from discontinuities of said scanning beam current; inserting into the picture signal during said one part of said retrace time periods a direct current component corresponding to said mean constant first reference value under the control of a first control circuit having a time constant large enough so that said high-frequency statistical fluctuations of said first reference value are integrated; inserting during a different part of said retrace time periods occurring between consecutively scanned lines in the picture signal a noise-free second reference value of constant level; and restoring in said picture signal said different part of said retrace time periods a constant level by said noise-free second reference value under the control of a second control circuit having a time constant small enough so that low-frequency noise superimposed on the picture signal is substantially compensated.

12. In a television image pick-up arrangement, in combination, pick-up camera means including a pick-up tube having a storage electrode adapted to store an image representing charge pattern and means for scanning at a predetermined scanning line frequency and a predetermined field frequency said pattern on said storage electrode by means of a scanning beam and producing by means of a beam current returned by said beam a picture signal corresponding to said scanned charge pattern; first control means for controlling the intensity of said scanning beam current in response to first synchronizing pulses during one part of its retrace time periods in such a manner that said beam current intensity assumes a mean constant first reference value different from zero but subject to high frequency statistical fluctuations resulting from discontinuities of said scanning beam current; first control circuit means for inserting into the picture signal during said one part of said retrace time periods a direct current component corresponding to said means constant first reference value under the control of said first synchronizing pulses, said first control circuit means having a time constant large enough so that said high-frequency statistical fluctuations of said first reference value are integrated; second control means for controlling during a different part of said retrace time periods in response to second synchronizing pulses the intensity of said scanning beam current in such a manner that said beam current intensity assumes a substantially zero value whereby a noise-free second reference value of constant level is produced; second control circuit means for restoring in said picture signal during said different part of said retrace time periods a constant level of said noise-free second reference value under the control of said second synchronizing pulses, said second control circuit means having a time constant small enough so that low-frequency noise superimposed on the picture signal is substantially compensated; and pulse source means for furnishing any of said synchronizing pulses simultaneously to said control means and to said control circuit means.

13. An arrangement as claimed in claim 12, wherein said pulse source means include a keying stage for deriving from synchronizing pulses of line scanning frequency two interlaced pulse sequences of half the line scanning frequency wherein successive pulses have different amplitudes and are applied as said first synchronizing pulses to said first control means, said first control means including amplitude separator means for clipping the larger amplitude pulses of said interlaced pulse sequences and for eliminating every alternate one of the remaining equal amplitude pulses thus producing a pulse sequence at half the line scanning frequency.

14. An arrangement as claimed in claim 12, wherein said pulse source means include means for deriving from a sequence of synchronizing pulses of line scanning frequency a pulse sequence of half the line scanning frequency and means for combining said two sequences to a combined pulse sequence, said first control means including amplitude separator means for deriving from said combined pulse sequence a second pulse sequence of half the line scanning frequency but shifted relative to the original sequence of synchronizing pulses by the amount of one line period.

15. An arrangement as claimed in claim 12, wherein said pulse source means include means for deriving from a sequence of synchronizing pulses of line scanning frequency a sequence of pulses of the same frequency but of alternatingly opposite polarities, said first control means including amplitude separator means for clipping the amplitude of said opposite polarity pulses and to separate them into two interlaced pulse sequences of half the line scanning frequency, said amplitude separator means applying one of said interlaced pulse sequence to said first control means so as to act as said first synchronizing pulses and applying the other one of said interlaced pulse sequences to said second control means so as to act as said second synchronizing pulses.

16. An arrangement as claimed in claim 12, wherein means are provided for returning the output picture signal to said second control means during said retrace time periods, and wherein said pulse source means include means for superimposing said second synchronizing pulses upon said output picture signal returned during said retrace time periods to said second control means resulting in a pulse sequence of an amplitude exceeding the picture signal range, said second control means including amplitude separator means for deriving from said pulse sequence of exceeding amplitude the pulses required for causing said beam current intensity to assume said first reference value during said retrace time periods.

17. An arrangement as claimed in claim 12, wherein said second control circuit means for inserting said noise-free second reference value and having a comparatively small time constant is arranged serially ahead of said first control circuit means for inserting said direct current component and having a comparatively large time constant.

18. An arrangement as claimed in claim 12, wherein said first control circuit means include a clamping circuit comprising diodes connected in anti-parallel arrangement and capacitor means chargeable thereby and having a capacity of the order of .1 uf., and wherein said second control circuit means include a clamping circuit comprising diodes in anti-parallel arrangement and capacitor means having a capacity of the order of 1000 pf.

19. An arrangement as claimed in claim 12, wherein said first synchronizing pulses are applied to said first control means at field frequency and wherein said first control means control in response to said first synchronizing pulse said scanning beam current intensity by temporarily displacing the potential of said storage electrode so that said pick-up tube supplies the black level value of the picture signal during the interval between fields, and wherein said second synchronizing pulses are applied to said second control means at line scanning frequency and wherein said second control means control in response to said second synchronizing pulses by suppressing said scanning beam at its starting electrode so that said noise-free second reference value is obtained during the intervals between successive line scannings.

20. An arrangement as claimed in claim 12, wherein said first control circuit means include a clamping circuit keyed by said first synchronizing pulses, said pulse source means furnishing said first synchronizing pulses at field frequency, while said first synchronizing pulses are periodically interrupted by said second synchronizing pulses furnished by said pulse source means at line scanning frequency.

References Cited by the Examiner

Luther: RCA Technical Note T.N. No. 389, June 1960.

DAVID G. REDINBAUGH, *Primary Examiner.*

J. McHUGH, R. L. RICHARDSON,
*Assistant Examiners.*